United States Patent [19]

LaTouche

[11] Patent Number: 5,444,934
[45] Date of Patent: Aug. 29, 1995

[54] INTRODUCTION AND DESCRIPTION OF THE PRIOR ART

[76] Inventor: Desmond J. LaTouche, 1315 Patricia Blvd., Kingsville, Ontario, Canada, N9Y 2R3

[21] Appl. No.: 166,716

[22] Filed: Dec. 14, 1993

[51] Int. Cl.$^6$ .......................................... A01K 87/00
[52] U.S. Cl. ...................................... 43/18.1; 43/21.2
[58] Field of Search ...................... 43/18.1, 18.5, 21.2, 43/22

[56] References Cited

U.S. PATENT DOCUMENTS

| | | | |
|---|---|---|---|
| 465,254 | 12/1891 | Felker | 43/18.1 |
| 797,637 | 8/1905 | Terry | 43/22 |
| 1,285,679 | 11/1918 | Glowacki | 43/18.1 |
| 2,546,079 | 3/1951 | Seviola | 43/18.1 |
| 2,742,728 | 4/1956 | Boyd | 43/18.5 |
| 3,417,500 | 12/1968 | Carabasse | 43/18.1 |
| 3,447,254 | 6/1969 | Sobel | 43/18.1 |
| 3,618,253 | 11/1971 | Edwards | 43/18.1 |
| 4,027,419 | 6/1977 | Popeil | 43/18.1 |
| 4,237,639 | 12/1980 | Uemori | 43/18.1 |
| 4,443,963 | 4/1984 | Braaten | 43/21.2 |

*Primary Examiner*—Kurt Rowan
*Attorney, Agent, or Firm*—Bauer & Schaffer

[57] ABSTRACT

A collapsable fishing rig is disclosed with an internal reel that can be removed and replaced without tools to accommodate either left or right handed users; an external clamp for attachment of an external reel; retractable storage for single-piece or telescoping rod; an extension handle for extra leverage; and a peg for snow or ice or ground attachment for "hands-free" fishing. The extension and rod-storage section fold towards the main body, and the resulting unit is compact enough to hang from a belt or backpack or be placed in a suitcase; an additional carry-case is provided that can accommodate the collapsed rig and also has pockets to hold extra rods and lures and the like.

18 Claims, 8 Drawing Sheets

INTRODUCTION AND DESCRIPTION OF THE PRIOR ART

The present invention relates to fishing, in particular to the need for more convenient carrying of the rod and more options in reel and rod configurations in one single unit.

Little needs to be said to introduce this topic to people who fish, but in case you do not, note that the length of the rod is a major limiting factor in the convenience of this sport, since fishing rods of a useful length don't fit inside anything very well; certainly not in vehicle trunks, backpacks, or carrying cases. And the need for different reel types for different bodies of water or species of fish will necessitate carrying several rods unless ample provision is made for interchangeability on the rod handle. In the best-case scenario this will include the ability to change reels for left-and right-handed users.

Although several attempts are recorded in the patent literature to solve the first problem—that of the length of the rod—such as U.S. Pat. No. 3,447,254, (Sobel. 1969); or to provide a novel custom integral reel, such as U.S. Pat. No. 2,578,477 (Hurd. 1951) and U.S. Pat. No. 2,752,717 (Lind. 1952); or a collapsable rig with a built-in reel. Canadian patent No. 1011552 (Popeil. 1977), all of these suffer from having a single built-in reel type, among other shortcomings.

The present invention has been specifically designed to address all the needs listed above, as well as to do so in a uniquely efficient fashion that will allow multiple styles of fishing by inclusion of different combinations of rods and reels in one single unit: and to add further refinements.

In brief, the invention consists of a main body or primary handle threaded onto a nose cone, containing between them an industry standard reel. The reel can be of either left or right-hand orientation, and can be removed for maintenance or replacement without resorting to tools. A folding rod-mast pivoted on the nose cone also serves as a rod storage unit, while a folding extension handle pivoted to the other end of the main body allows for leverage in heavy fishing situations. The extension has a cavity to insert a peg to drive into the ground or snow, so the rod can be supported and will "fish by itself". On the lower side of the main body is a standard reel-clamp to attach any industry standard external reel.

Either a telescoping or a one-piece rod can be fitted into the rod-mast, and slid inside for storage. The unit folds neatly into three roughly equi-length pieces at the pivots, and a carry pouch is provided that also has space for the peg and additional lures and hooks and so forth; the pouch, with the rod inside, can be worn on the angler's belt; or so can the unit without the pouch, by a swivel-hook.

The invention is uniquely adaptable for use by novice or experienced anglers in boats, from the shore, or in ice fishing, by hikers, boaters, backpackers, or fly-in fishermen.

An object of the invention is to disclose a portable collapsable fishing rig providing attachment means for internal and external industry standard reels of left and right-hand orientation, an extension handle for extra leverage, and internal storage of a rod, in which the internal reel can be removed and replaced without any tools. There may be additionally a peg to support the rig from a solid surface, and a cavity fashioned in the extension handle to receive the peg. There may additionally be a carrying-case to carry the rig and additional hooks and rods and so forth, and also means of attachment of the case and rig to a belt.

It is also an object to disclose a portable collapsable fishing rig comprising:

a main body with a pistol grip, comprising; an internal main body cavity; two indentations formed in the main body communicating with the cavity; and screw threads fashioned in the main body at the opening of the cavity; and in which the cavity is fashioned to receive one portion of an industry standard closed face spinning reel with gear mechanism protruding through one of the indentations, the other indentation being plugged with a rubber plug; a nose cone with a cavity opposing the main body cavity, fashioned to receive the remaining portion of the spinning reel, and threaded to screw together with the thread on the main body;

a rod mast pivotally connected to the nose cone;
a rod-slide cavity within the rod mast;
a rod-slide within the rod-slide cavity;
a rod-slide thumb screw;
a single-piece rod removably fitted into the rod-slide;
a telescoping rod;
lock bolts between the rod mast and nose cone;
an extension handle pivotally connected to the main body;
a lock bolt between the extension handle and main body;
a peg in a peg cavity in the extension handle; and
an external rod clamp attached to the main body;

so a person may place the spinning reel into the main body cavity; screw on the nose cone; pivot the rod mast to align longitudinally with the main body; fasten the lock bolts between the rod mast and nose cone; extend the rod by extending the rod-slide manually; fasten the rod in position by fastening the rod-slide thumb-screw; and fish.

It is also an object to disclose how a person further may optionally pivot the extension to align longitudinally with the main body; fasten the lock bolt between the extension handle and main body; and so be provided with an extended handle.

It is also an object to disclose how a person further may optionally place the peg in the peg cavity and the peg in a solid surface to engage in hands-free fishing.

It is also an object to disclose how a person further may optionally attach an external industry standard reel to the main body and fish using it instead of the internal reel.

It is also an object to disclose how a person further may optionally remove the single-piece rod and insert a telescoping rod.

It is also an object to disclose how a person further may collapse the collapsable rig for transportation by releasing the thumb screw, retracting the rod into the rod mast, releasing the lock bolts, and pivoting the extension handle and the rod mast towards the main body.

It is also an object to provide for such a rig in which there is a spring-clip to secure the extension handle to the main body in collapsed position, a Velcro TM strap to secure the rod mast and rod during transportation and storage, means to hang the collapsed rig from a belt or backpack or the like, and a carry pouch fashioned to carry the collapsed rig and additional items such as a spare rod and lures.

It is also an object to provide for such a rig in which the internal reel has a right-hand gear mechanism, for a right-handed user, that fits into one of the indentations; so that a left-handed reel gear mechanism, for a left-handed user, could equally-well be accommodated by moving the rubber plug to the other side.

It is also an object to provide for such a rig in which a conical inner surface of the nose cone abuts the internal reel so as to function as a clamp for the line during casting.

DETAILED DESCRIPTION OF THE INVENTION

Figure 1:
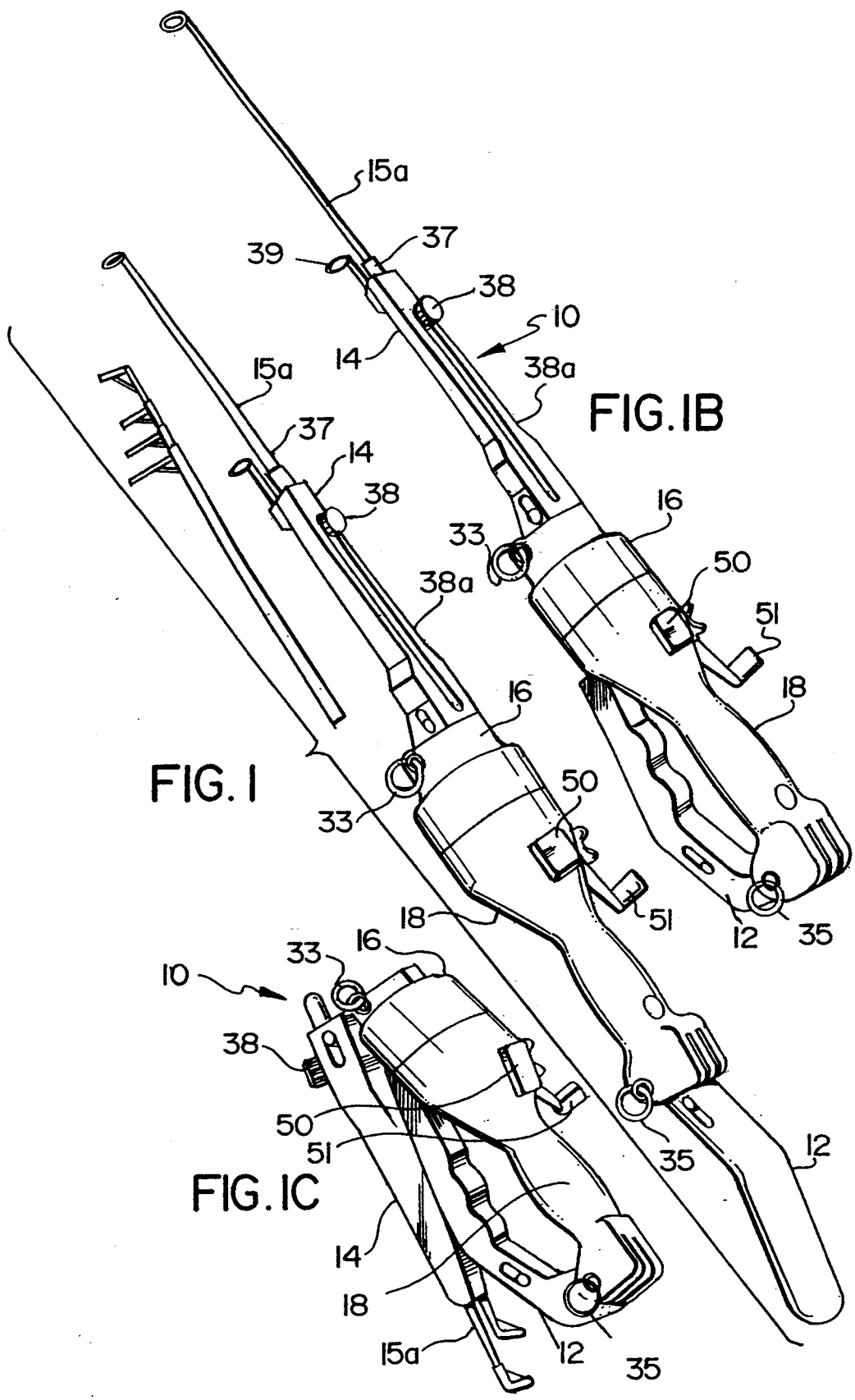
Figure 2:
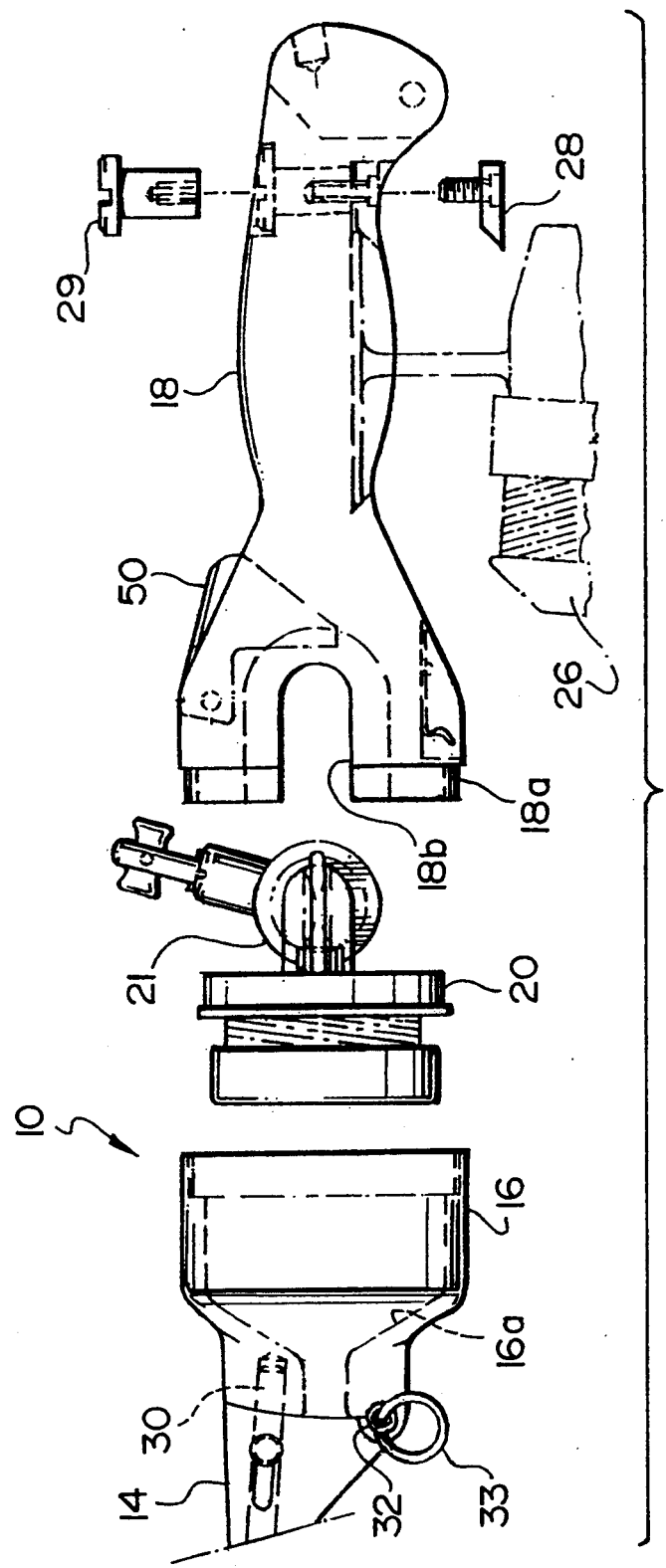
Figure 3:
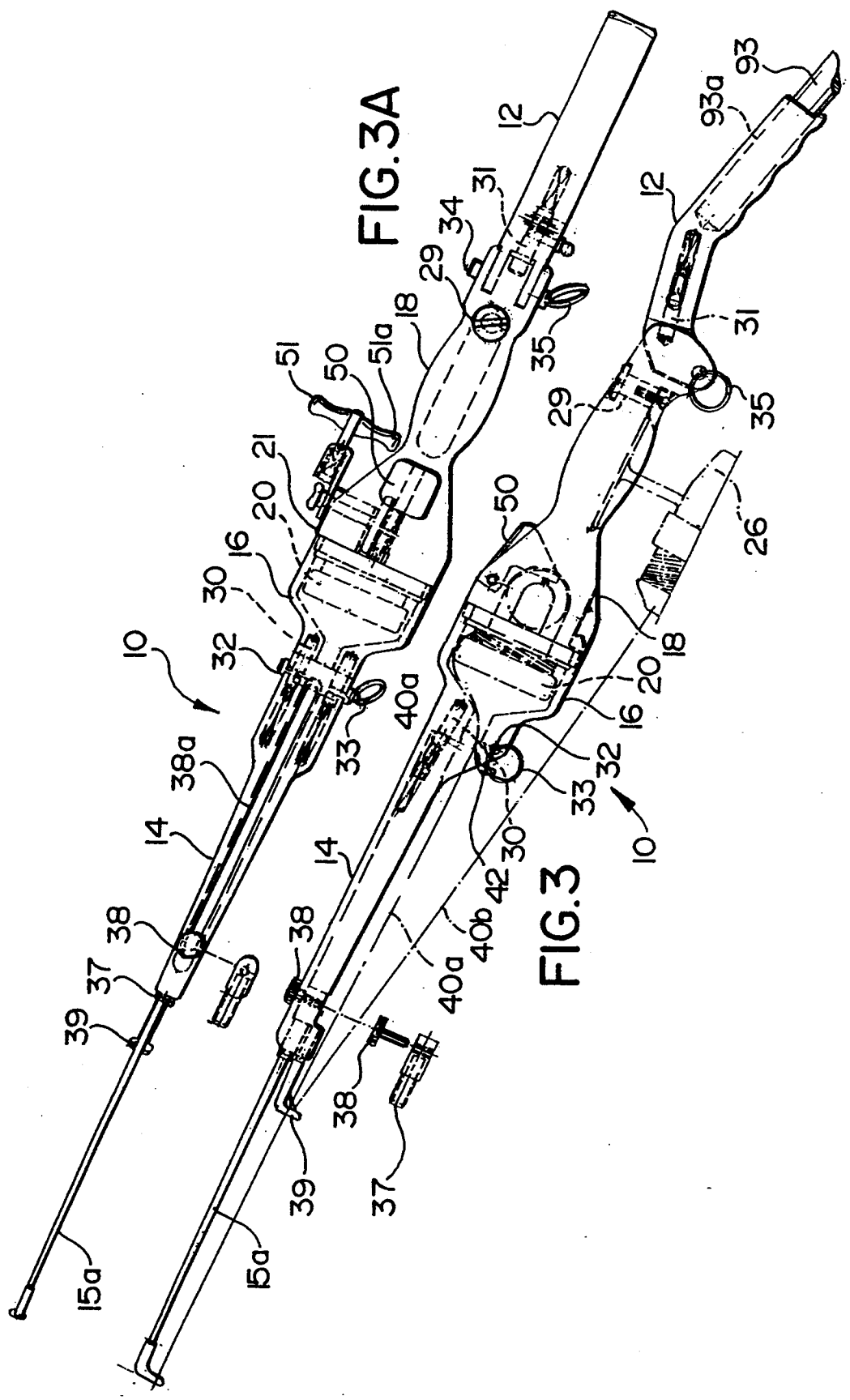
Figure 4:
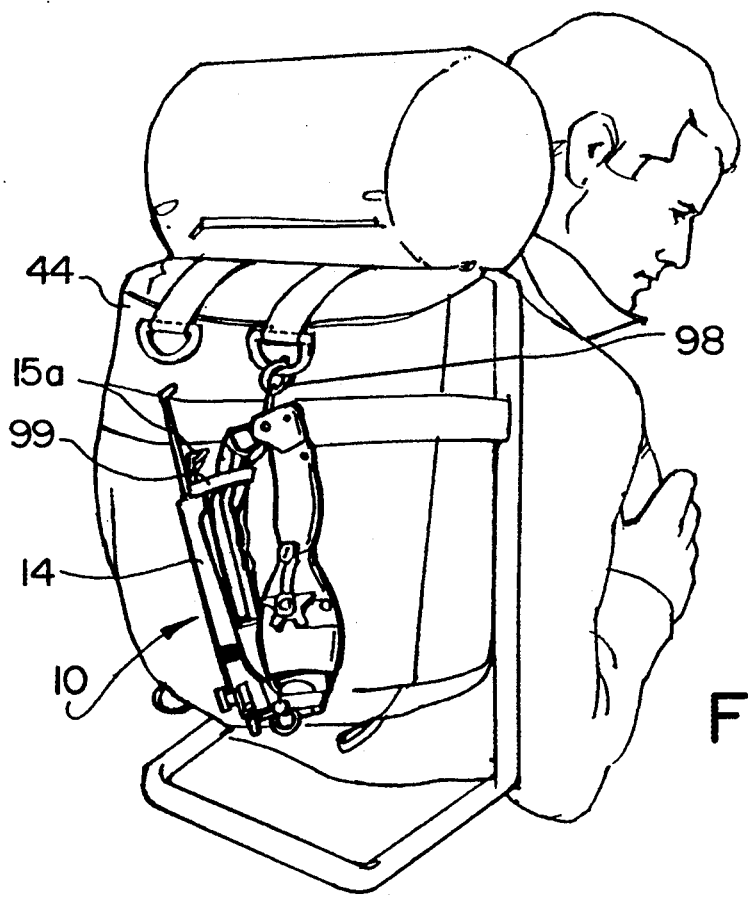
Figure 5:
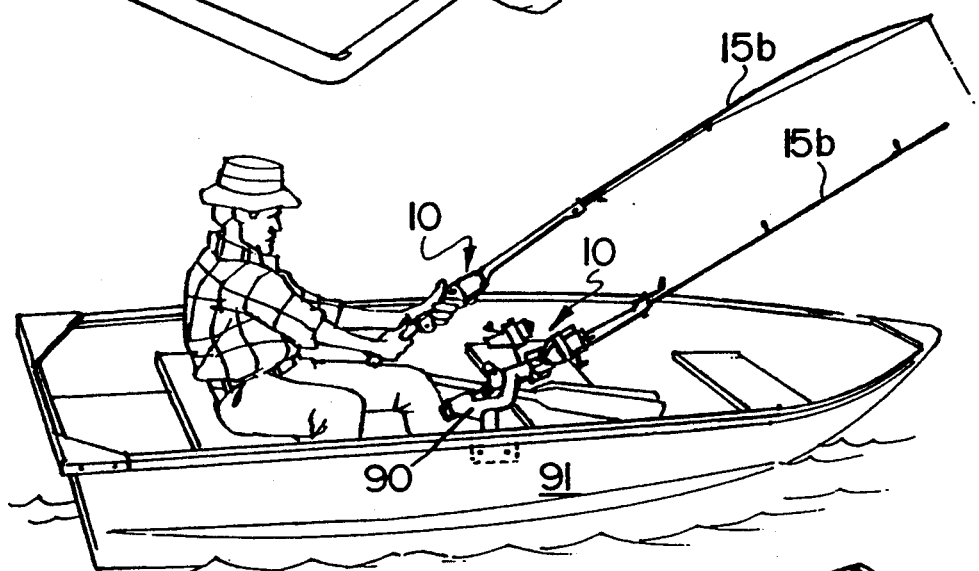
Figure 6:
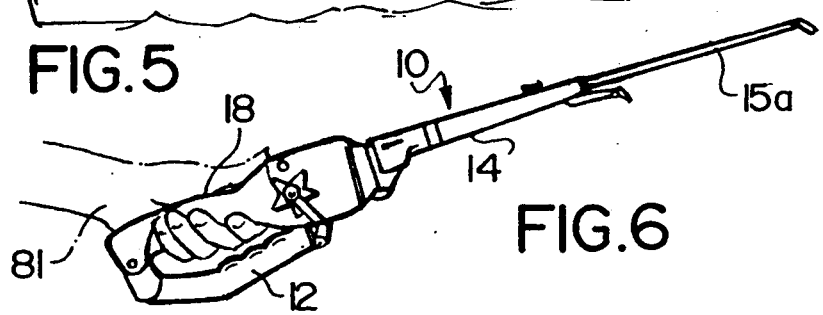
Figure 7:
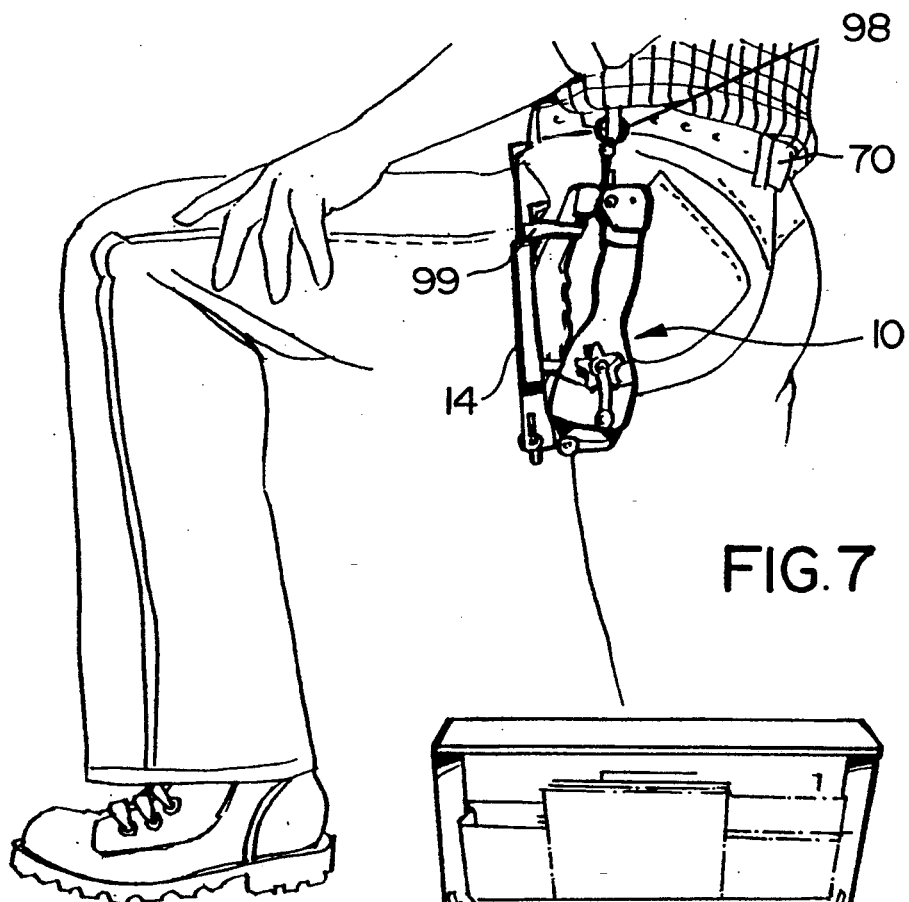
Figure 8:
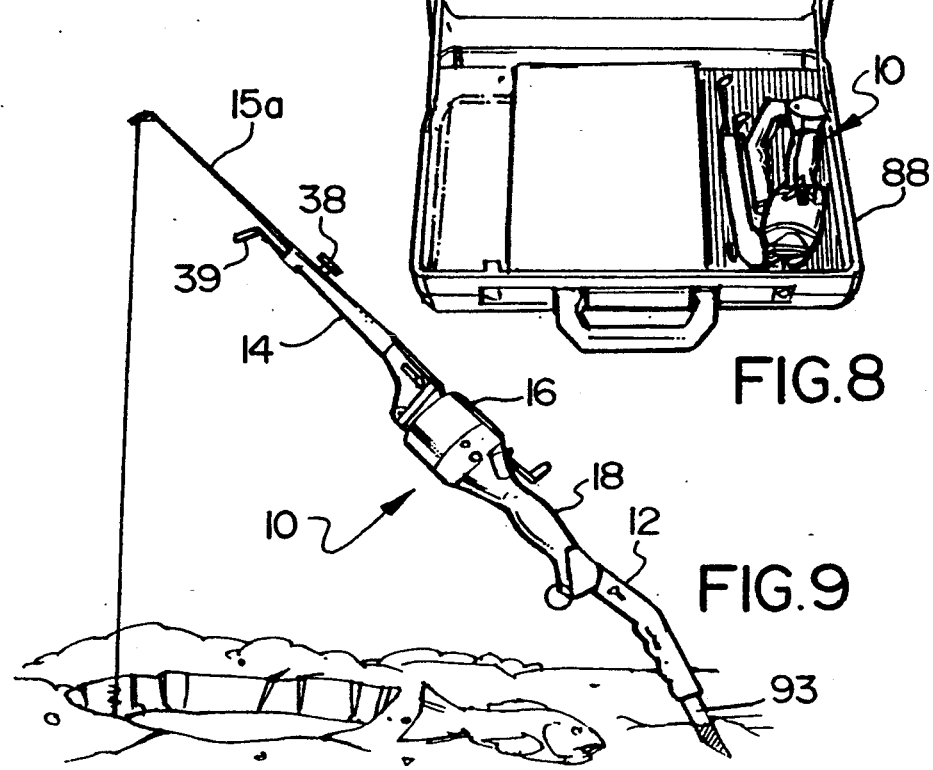
Figure 9:
Figure 10:
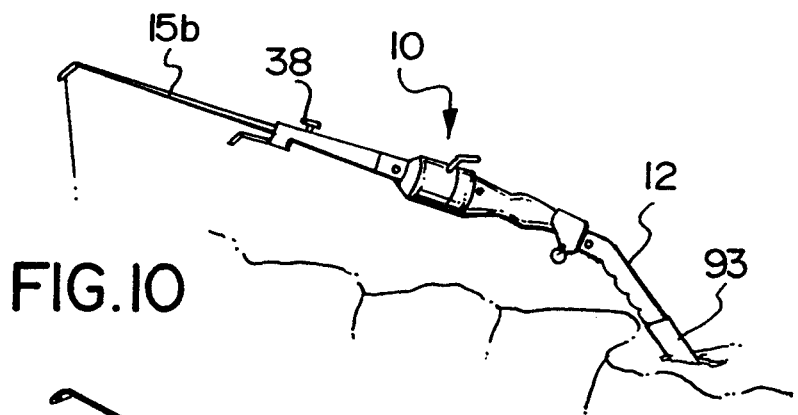
Figure 11:
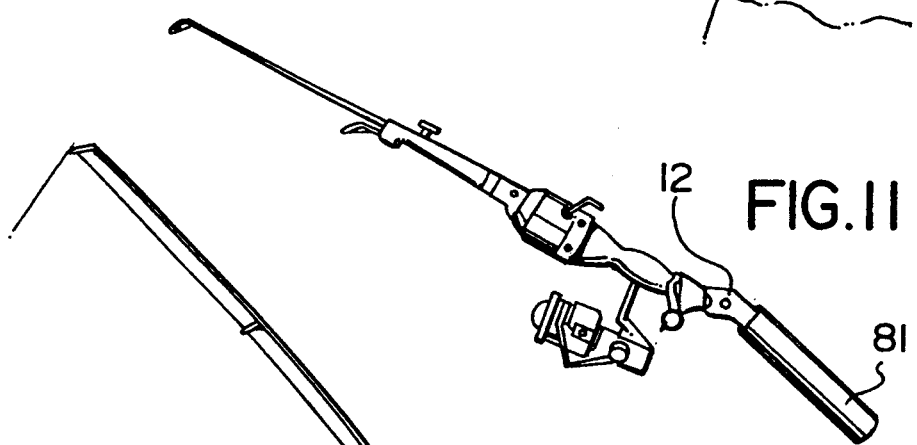
Figure 12:
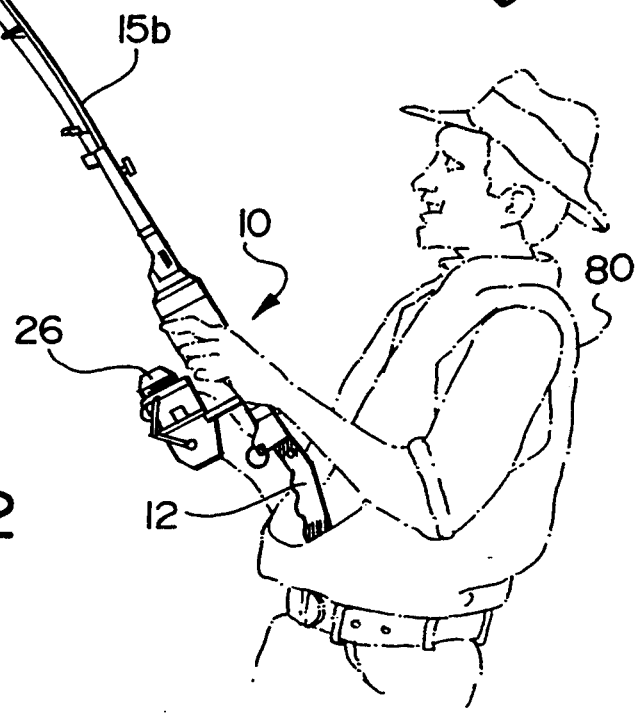
Figure 13:
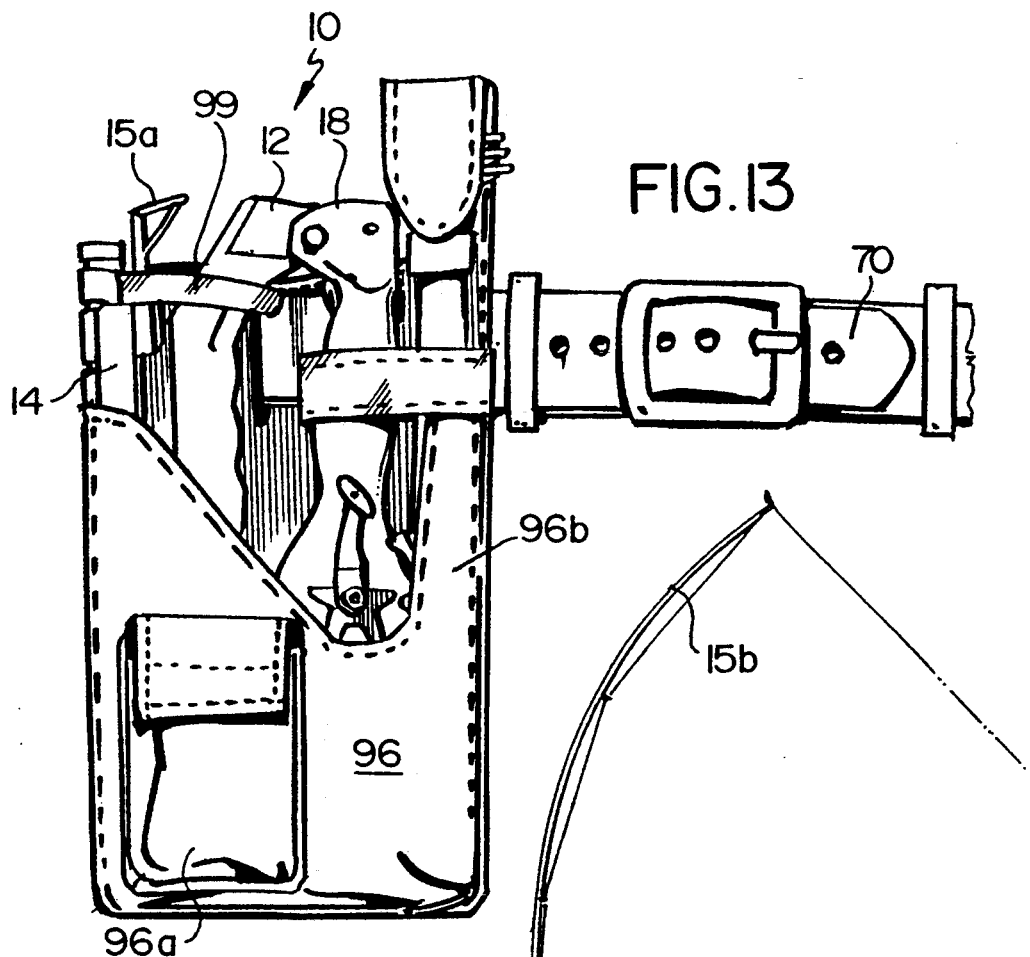
Figure 14:
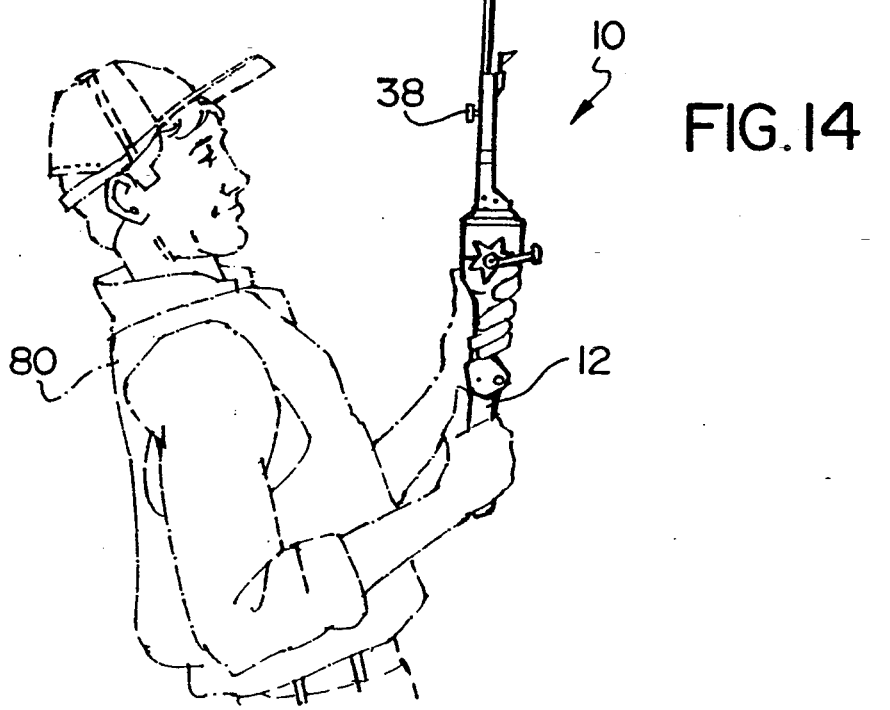
Figure 15:
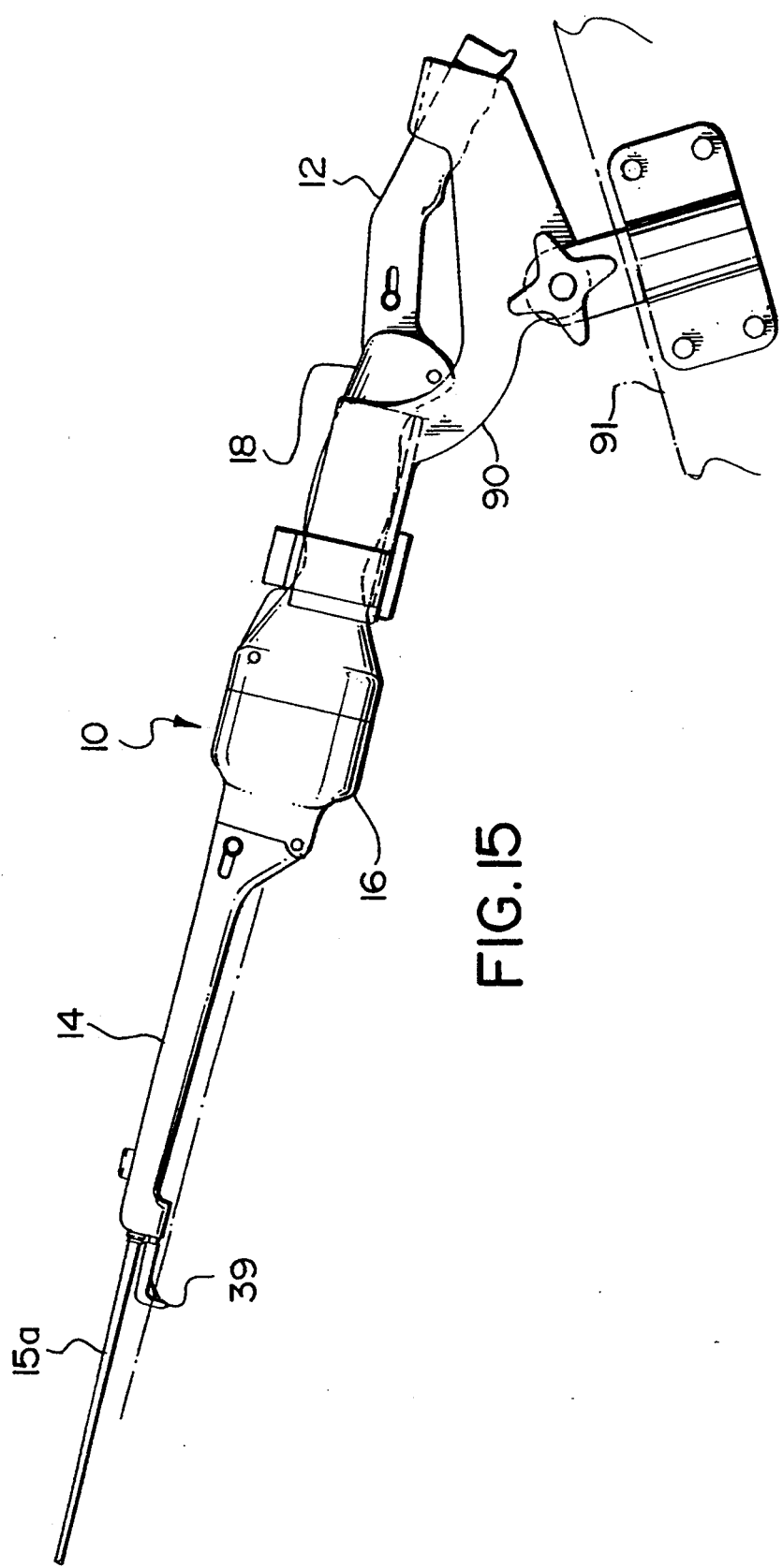

For this description, refer to the following diagrams, wherein like numerals refer to like parts:

FIG. 1 illustrated embodiment of the invented rig, perspective view;

FIG. 1B, partially collapsed version of FIG. 1, perspective view;

FIG. 1C, fully collapsed version of FIG. 1, perspective view;

FIG. 2, portion of the embodiment of FIG. 1 disassembled, side elevation view;

FIG. 3, the illustrated embodiment, side elevation view;

FIG. 3A, the illustrated embodiment, top view;

FIG. 4, transportation usage situation of the illustrated embodiment, perspective view;

FIG. 5, fishing usage situations, perspective view;

FIG. 6, alternative fishing usage situation, perspective view;

FIG. 7, alternative transportation situation, perspective view;

FIG. 8, alternative transportation situation, perspective view;

FIG. 9, alternative fishing usage situation, perspective view;

FIG. 10, alternative fishing usage situation, perspective view;

FIG. 11, alternative fishing usage situation, perspective view;

FIG. 12, alternative fishing usage situation, perspective view;

FIG. 13, alternative fishing usage situation, perspective view;

FIG. 14, alternative fishing usage situation, perspective view;

FIG. 15, alternative fishing usage position, side elevation.

FIGS. 1, 1A and 1B illustrate the chief modes of a preferred embodiment of the invented collapsable fishing rig generally indicated as 10; in FIG. 1 collapsable rig 10 is in fully extended form, with extension handle 12 in extended position and rod mast generally indicated at 14 also in extended position. Single-piece rod 15a is shown in place, with telescoping rob 15b alongside (in FIG. 1) which could instead be used inside rod mast 14 if desired. In FIG. 1B extension handle 12 has been rotated into the collapsed position; in FIG. 1C rod mast 14 has also been rotated and the collapsable rig 10 is fully collapsed and ready for storage or transport.

FIG. 2 illustrates key aspects of the invention not visible on FIGS. 1, 1B, and 1C, in particular internal reel generally indicated as 20 and external reel 26. In this view the collapsable rig 10 has been partially disassembled by unscrewing nose cone generally indicated as 16 (with pivotally attached rod mast 14) from main body generally indicated as 18, where it was threaded onto threads 18a. Internal reel 20 is here illustrated as an industry standard closed face spinning reel, and is completely freed from collapsable rig 10, as shown, merely by the unscrewing of nose cone 16 from thread 18a as just described. Reel clamp 28 is provided to hold optional industry standard external reel 26 in recessed slot 25 shown ghosted, fixed by slotted thumb screw 29. Internal conical surface 16a, shown dotted, of nose cone 16, functions as retaining cap and clamp for internal reel 20 during casting (this clamping is not illustrated).

Lock bolts 30 situated between nose cone 16 and rod mast 14 are internal and so shown dotted, and are best understood with reference to FIGS. 3 and 3A, where they are shown in locked position. A similar, single, lock bolt 31 connects the extension handle 12 to main body 18. Thumb knobs 30a and 31a shown on FIG. 1 release lock bolts 30 and lock bolt 31, respectively. With reference to FIGS. 3 and 3A, pivot pins 32 and 34 allow rotation between rod mast 14 and nose cone 16, and main body 18 and extension handle 12, respectively. Pins 32 and 34 are fastened by standard key rings 33 and 35 respectively. Rod slide locking thumb screw 38 fastens rod slid 37, and hence rod 15a which is fitted into it, in position.

Fixed rod-tip 39, seen on FIG. 3, guides internal line 40a or external line 40b, depending on which reel is in use. In FIG. 3 external reel 26 is shown in use, so internal line 40a is shown dotted, and swivel-snap 42 from actual line 40a (also shown dotted, since not visible in this view) is shown parked on key 33. Internal reel 20, also not visible in FIG. 3 or 3A, is shown ghosted.

Finally, thumb latch 50 operates internal reel 20 in a standard manner for casting and retrieving line, and reel handle 51, part of industry standard internal reel 20, is fashioned in a known manner so that it is spring loaded and can be rotated 180 degrees for storage, to the dotted position 51a in FIG. 3A.

Use of the rig has been partially detailed in the description of parts in the foregoing, and the functional aspects of the industry standard reels will be omitted, in terms of actual fishing operations; these can be assumed. The unique aspects of the invention that should be noted are as follows.

Assuming a starting position with the collapsable rig 10 fully assembled as in FIG. 1, one-piece rod 15a can be in use as illustrated, or thumb screw 38 can be loosened and telescoping rod 15b, shown separate, inserted in its place, such as shown in FIGS. 5, 12 and 14. Additional external spinning reel 26 can be added, as detailed in FIG. 2 and in usage situation in FIG. 12, and this is the situation that would be used for maximum power. Note in FIG. 12 that fishing person 80 is using extension handle 12 as a brace, which is one of several uses for extension 12. Another use is shown in FIG. 5, where fishing person 80 is using a two-handed grip including extension 12; another in FIG. 11 where a downrigging rod holder 81 encloses extension 12; another in FIG. 15 (and also less detailed in FIG. 5) where industry standard rod holder 90 attached to boat 91 holds collapsable rig 10 by main body 18 and extension 12. Note that collapsable rig 10 has been specially designed to fit into an industry standard rod holder such as 90. And finally, an important use for extension 12 is as holder for peg 93, shown in FIG. 3 and illustrated in possible usage positions in FIGS. 9 and 10 for "hands-free" ice-fishing and riverbank fishing respectively. Peg 93 fits into slot 93a shown ghosted in FIG. 3, fashioned in extension handle 12.

Another usage configuration, generally for restricted spaces such as ice-fishing huts (these are not shown), is that illustrated in FIG. 1B and FIG. 6, for which lock bolt 31 (ghosted) on FIG. 3A has been released and extension handle 12 has been rotated underneath main body 18 and secured with spring-clip 19 (shown on FIG. 2). Hand 81 is illustrated in usage position in FIG. 6, with customary "pistol-grip" position of hand 81 around main body 18.

Left and right handed versions of internal reel 20 are equally-well accommodated, which can be understood with reference to FIGS. 2 and 3A; (only the right-hand version is shown). The near-side indentation 18b, seen on FIG. 2, is not in use and would be filled with a rubber plug (not shown), while a mirror-image indentation (not numbered) fashioned on the other side of main body 18 actually receives gear mechanism 21 of internal reel 20 into the position shown in FIG. 3A. Thus if a reel with a left-handed mechanism were used, it would merely be necessary to transfer such a rubber plug to the other side (this is not shown).

It will be appreciated also that an ingenious part of the otherwise industry standard operation of internal reel 20 is to have it press against the conical internal surface 16a, shown ghosted in FIG. 2, of nose cone 16. Thus there is not need attach any solid part to reel 20, and accordingly it is free to be removed without tools when collapsable rig 10 is disassembled as shown in FIG. 2, which is very advantageous for a portable unit, since tools will not always be readily available in places where collapsable rig 10 is likely to be taken.

When it is desired to transport the unit, the extension handle 12, if extended, is free, rotated, and latched as just described to the position in FIG. 1B, and rod locking thumb screw 38 released and pulled towards nose cone 16, along track 38a. This pulls rod slide 37 and rod 15a to a safe storage position inside rod mast 14, as shown in FIG. 1C. The collapsable rig 10 can now be easily transported as shown in FIG. 4 (hanging from backpack 44); FIG. 7 (hanging from belt 70); FIG. 8, (placed inside suitcase 88) and FIG. 13 (inside special carry pouch 96); a simple Velcro TM strap 99 can be used as illustrated in FIGS. 4, 7 and 13 to secure rod mast 14 and rod 15a. In FIGS. 4 and 7a swivel hook 98 secured to backpack 44 and belt 70 respectively easily attaches to key ring 35 (seen on FIG. 1C and FIGS. 3 and 3A) for suspended transportation of the collapsable rig 10; alternatively the unit may be placed in custom carry pouch 96 illustrated in FIG. 13 looped through belt 70. The pouch may have special pockets 96b for extra rods such as 15x (which may be single section or telescopic); special pockets such as 96a illustrated, for lures and the like (not shown); and special loop 96P for peg 93.

The foregoing is by example only, and the scope of the invention should be limited only by the appended claims.

The embodiments of the invention in which an exclusive property or privilege is claimed as defined as follows:

1. A portable collapsible fishing rig providing attachment means for internal and external industry standard reels of left and right-hand orientation, and for internal storage of a rod, said rig comprising a longitudinally extending main body adapted to be gripped by the user and having a cavity open at one end for receiving an internal reel, a nose cone screwably attached to one end of the main body to removably enclose said cavity, an extension handle pivotally attached to the other end of said main body for extra leverage, and a rod mast pivotally attached to the free end of said nose cone, said rod mast adapted to support a rod during fishing and having a cavity to store said rod when not fishing.

2. A rig as in claim 1 in which the internal reel can be removed and replaced without any tools.

3. A rig as in claim 1 additionally providing a peg to support the rig from a solid surface, and a cavity fashioned in the extension handle to receive the peg.

4. A rig as in claim 1 additionally providing a carrying-case to carry the rig and additional hooks and rods and so forth, and also providing means of attachment of the case and rig to a belt.

5. A rig as in claim 1 in which the rod is a one-piece rod that can be removed and replaced with a telescoping rod.

6. A rig as in claim 1 in which the internal reel can be removed and replaced without any tools.

7. A rig as in claim 1 additionally providing a peg to support the rig in the ground, and a cavity fashioned in the extension handle to receive the peg.

8. A rig as in claim 1 in which the internal reel is an industry standard closed face spinning reel having a protruding, say right-hand, gear mechanism that fits into an indentation provided in the main body abutting the nose cone; and further in which a rubber plug is provided to block a mirror image indentation on the other, say left, side of the main body; so that a left-handed reel gear mechanism could equally-well be accommodated by moving the rubber plug to the other side.

9. A rig as in claim 1 in which a conical inner surface of the nose cone abuts the internal reel so as to function as a clamp for the line during casting.

10. A portable collapsable fishing rig comprising:
a longitudinally extensive main body;
a conical nose cone threadably engaged with the main body;
a main body cavity therebetween fashioned to receive internally an industry standard reel;
a rod mast pivotally connected to the nose cone;
means of fastening the rod mast parallel to the nose cone;
a rod removable fitted into the rod mast;
means of extending and retracting the rod;
means of fastening the rod in the extended and retracted positions;
an extension handle pivotally connected to the main body;
means of fastening the extension handle approximately parallel to the main body;
a peg cavity in the extension handle and peg to fit therein; and
an external reel clamp attached to the main body;
wherein a person may place an internal reel in the main body cavity;
screw on the nose cone; fasten the rod mast to the nose cone; extend the rod; fasten the rod in position; optionally fasten the extension handle to the main body; optionally insert the peg in a solid surface; optionally attach an external industry standard reel to the main body by means of the external reel clamp; optionally remove the rod and insert a different rod; and fish;

and wherewith a person further may collapse the collapsable rig for transportation by retracting the rod into the rod mast and pivoting the extension handle and the rod mast towards the main body.

11. A rig as in claim 10, in which there is also means to secure the extension handle to the main body in collapsed position, means to secure the rod mast and rod during transportation and storage, and means to hand the collapsed rig from a belt or backpack or the like.

12. A rig as in claim 10, in which there is also a carry pouch fashioned to carry the collapsed rig and additional items.

13. A rig as in claim 10 in which the internal reel is an industry standard closed face spinning reel having a protruding, say right-hand, gear mechanism that fits into an indentation provided in the main body abutting the nose cone; and further in which a rubber plug is provided to block a mirror image indentation on the other, say left, side of the main body; so that a left-handed reel gear mechanism could equally-well be accommodated by moving the rubber plug to the other side.

14. A rig as in claim 10 in which a conical inner surface of the nose cone abuts the internal reel so as to function as a clamp for the line during casting.

15. A portable collapsable fishing rig comprising:
a main body with a pistol grip, comprising:
   an internal main body cavity;
   two indentations formed in the main body and communicating with the cavity; and
   screw threads fashioned in the main body at the opening of the cavity;
   said cavity fashioned to receive one portion of an industry standard closed face spinning reel with gear mechanism protruding through one of the indentations, the other indentation being plugged with a rubber plug;
a nose cone with a cavity opposing the main body cavity, fashioned to receive the remaining portion of the spinning reel, and threaded to screw together with the thread on the main body;
a rod mast pivotally connected to the nose cone;
a rod-slide cavity within the rod mast;
a rod-slide within the rod-slide cavity;
a rod-slide thumb screw;
a single-piece rod removably fitted into the rod-slide;
a telescoping rod;
lock bolts between the rod mast and nose cone;
an extension handle pivotally connected to the main body;
a lock bolt between the extension handle and main body;
a peg;
a peg cavity in the extension handle; and
an external rod clamp attached to the main body;
wherewith a person may place the spinning reel into the main body cavity; screw on the nose cone; pivot the rod mast to align longitudinally with the main body; fasten the lock bolts between the rod mast and nose cone; extend the rod by extending the rod-slide manually; fasten the rod in position by fastening the rod-slide thumb-screw; and fish;
and wherewith a person further may optionally pivot the extension to align longitudinally with the main body; fasten the lock bolt between the extension handle and main body; and so be provided with an extended handle;
and wherewith a person further may optionally place the peg in the peg cavity and the peg in a solid surface to engage in hands-free fishing;
and wherewith a person further may optionally attach an external industry standard reel to the main body and fish using it instead of the internal spinning reel;
and wherewith a person further may optionally remove the single-piece rod and insert a telescoping rod;
and wherewith a person further may collapse the collapsable rig for transportation by releasing the thumb screw, retracting the rod into the rod mast, releasing the lock bolts, and pivoting the extension handle and the rod mast towards the main body.

16. A rig as in claim 15, in which there is also a spring-clip to secure the extension handle to the main body in collapsed position, a Velcro TM strap to secure the rod mast and rod during transportation and storage, means to hang the collapsed rig from a belt or backpack or the like, and a carry pouch fashioned to carry the collapsed rig and additional items such as a spare rod and lures.

17. A rig as in claim 15 in which the internal reel has a right-hand gear mechanism, for a right-handed user, that fits into one of the indentations; so that a left-handed reel gear mechanism, for a left-handed user, could equally-well be accommodated by moving the rubber plug to the other side.

18. A rig as in claim 15 in which a conical inner surface of the nose cone abuts the internal reel so as to function as a clamp for the line during casting.

* * * * *

UNITED STATES PATENT AND TRADEMARK OFFICE
CERTIFICATE OF CORRECTION

PATENT NO. : 5,444,934
DATED : August 29, 1995
INVENTOR(S) : Desmond J. LaTouche It is certified that error appears in the above-identified patent and that said Letters Patent is hereby corrected as shown below:

Title Page, [54]: "INTRODUCTION AND DESCRIPTION OF
THE PRIOR ART" should be
--COLLAPSIBLE FISHING RIG--

Claim 11, Column 7, line 8: "hand" should be --hang--.

Signed and Sealed this

Fifth Day of December, 1995

Attest:

BRUCE LEHMAN

*Attesting Officer*  *Commissioner of Patents and Trademarks*